United States Patent
Xu

(10) Patent No.: US 10,150,403 B2
(45) Date of Patent: Dec. 11, 2018

(54) BINDING BELT TENSIONER

(71) Applicant: Ningbo Yinzhou Anhong Tools Factory, Ningbo (CN)

(72) Inventor: An Xu, Ningbo (CN)

(73) Assignee: NINGBO YINZHOU ANHONG TOOLS FACTORY, Ningbo (CN)

( * ) Notice: Subject to any disclaimer, the term of this patent is extended or adjusted under 35 U.S.C. 154(b) by 64 days.

(21) Appl. No.: 15/595,633

(22) Filed: May 15, 2017

(65) Prior Publication Data

US 2018/0141480 A1    May 24, 2018

(30) Foreign Application Priority Data

Nov. 18, 2016 (CN) ..................... 2016 2 1236908 U

(51) Int. Cl.
*B60P 7/08* (2006.01)
*B65B 13/22* (2006.01)
(Continued)

(52) U.S. Cl.
CPC ............. *B60P 7/083* (2013.01); *B60P 7/0823* (2013.01); *B65B 13/22* (2013.01); *A44B 11/06* (2013.01); *B65B 13/18* (2013.01)

(58) Field of Classification Search
CPC ........ B60P 7/083; B60P 7/0823; B65B 13/22; B65B 13/18; A44B 11/06
See application file for complete search history.

(56) References Cited

U.S. PATENT DOCUMENTS 3,910,525 A * 10/1975 Takada .................... B60R 22/38
242/383.4
4,060,211 A * 11/1977 Takada .................... B60R 22/44
242/385.3

(Continued)

FOREIGN PATENT DOCUMENTS

CN    102275644    12/2011

*Primary Examiner* — Michael E Gallion
(74) *Attorney, Agent, or Firm* — Ladas & Parry, LLP

(57) ABSTRACT

A binding belt tensioner is provided, it relates to a ratchet type binding tool, and its structure includes a fastener, a wrenching part, a ratchet, a fixing binding belt and a tensioning binding belt, etc. Mainly, the ratchet shaft of the racket for winding the tensioning binding belt is provided with a coil spring and a coil spring locking mechanism which are coaxially mounted; when the ratchet shaft rotates for belt outputting, the coil spring can be driven synchronously to wind and compress the ratchet shaft to form elastic potential energy, and the elastic potential energy of the coil spring is locked by the coil spring locking mechanism; when the coil spring locking mechanism is operated to release the elastic potential energy of the coil spring, then the ratchet shaft is driven to automatically quickly rewind the tensioning binding belt for use of the binding belt tensioner next time. Therefore, by additionally disposing the coil spring and the coil spring locking mechanism on the ratchet shaft, while the fast and reliable binding of the goods by the binding belt tensioner is not affected, the binding belt tensioner has the advantages of portability in belt collecting, labor saving in operation and the like, such that the loading and unloading efficiency of the goods is improved and loading and unloading of the goods become simpler and ordered.

10 Claims, 15 Drawing Sheets

(51) Int. Cl.
*A44B 11/06* (2006.01)
*B65B 13/18* (2006.01)

(56) References Cited

U.S. PATENT DOCUMENTS

| | | | | |
|---|---|---|---|---|
| RE29,594 E | * | 3/1978 | Takada | B60R 22/405 |
| | | | | 242/383.4 |
| 4,083,511 A | * | 4/1978 | Ikesue | B60R 22/405 |
| | | | | 242/383.4 |
| 4,349,164 A | * | 9/1982 | Naitoh | B60R 22/44 |
| | | | | 242/383.4 |
| 4,417,702 A | * | 11/1983 | Fohl | B60R 22/42 |
| | | | | 242/381.1 |
| 4,811,912 A | * | 3/1989 | Takada | B60R 22/415 |
| | | | | 242/382.2 |
| 5,103,536 A | * | 4/1992 | Kamper | B60P 7/083 |
| | | | | 24/68 CD |
| 6,195,848 B1 | * | 3/2001 | Jackson | B60P 7/083 |
| | | | | 24/68 CD |
| 9,809,145 B1 | * | 11/2017 | Ruan | B60P 7/0838 |
| 2011/0088226 A1 | * | 4/2011 | Degen | B25B 1/205 |
| | | | | 24/68 CD |
| 2011/0233493 A1 | * | 9/2011 | Huang | B60P 7/083 |
| | | | | 254/250 |
| 2016/0250961 A1 | * | 9/2016 | Tolly | B64D 25/06 |
| | | | | 410/100 |
| 2018/0141479 A1 | * | 5/2018 | Anderson | B60P 3/079 |
| 2018/0187441 A1 | * | 7/2018 | Underwood | F16M 13/02 |

* cited by examiner

BINDING BELT TENSIONER

CROSS REFERENCE TO RELATED APPLICATION

The present application claims the priority of Chinese Patent Application No. 201621236908.3, filed on Nov. 8, 2016, the content of which is incorporated herein by reference.

BACKGROUND

Technical Field

The present disclosure relates to a tensioner for quickly tensioning a binding belt for binding goods, in particular to a binding belt tensioner.

Related Art

At present, a binding belt is generally required for binding and bundling in a goods transportation process, so as to prevent goods from falling off due to bumping in the transportation process; therefore, the binding belt is undoubtedly very important for the binding and bundling of the goods, a traditional binding belt binding manner realizes fixing by tensioning with manpower and then knotting on a transportation vehicle, a bundling force of the goods is limited by the manpower and an insufficient bundling force is easily caused. CN invention patent with an application number 201110232540.9 discloses a "Ratchet Type Binding Belt Tensioner", a disclosed structure mainly comprises a fastener, a wrenching part and a ratchet which is coaxially rotatably mounted at the inner end of the fastener and at the inner end of the wrenching part, and the structure also comprises a fixing binding belt fixedly connected to the fastener and a tensioning binding belt of which one end is connected on a ratchet shaft of the ratchet in a winding manner and the other end forms a binding free end; meanwhile, a clamping part which elastically pushes and inwards slides is arranged in the fastener, and a checking part which elastically pushes and inwards slides is arranged in the wrenching part. Therefore, when the clamping part and the checking part are both meshed on the ratchet, the wrenching part is operated to perform continuous reciprocated wrenching relative to the fastener, and then the ratchet is driven to form one-way intermittent rotation, further the tensioning binding belt is wound to realize a tensioning action, and then binding and bundling of the goods are realized; when the clamping part and the checking part are both separated from the ratchet, the ratchet is in a free rotation state without restriction, at this point, the binding free end of the tensioning binding belt is pulled outwards to realize a belt outputting action, that is, the binding belt is pulled out for a proper use length according to the size of a binding volume of the goods.

The binding belt tensioner disclosed above can help people to perform fast and reliable binding and bundling of the goods, and has the advantages of large bundling force, labor saving of people, and the like; however, it is found in actual use that the binding belt tensioner still has some use defects, which is mainly embodied in a low efficiency of a belt collecting process, when the tensioning binding belt needs to be rewound on the ratchet after unloading for use next time, only the wrenching part can be operated with an action similar to that of binding and bundling the goods to perform continuous reciprocated wrenching relative to the fastener, such that the ratchet is driven to form one-way intermittent rotation. Finally, the tensioning binding belt is continuously wound on the ratchet section by section, such belt collecting manner undoubtedly brings lots of trouble when a reserved length of the binding free end of the tensioning binding belt is longer and loading and unloading are more frequent, not only are the loading and unloading of the goods affected, but also a loading and unloading sequence is disordered.

SUMMARY

The present disclosure aims to solve the technical problem of overcoming defects in prior art and provides a binding belt tensioner which is portable in belt collecting and laborsaving in operation, and capable of improving loading and unloading efficiency of goods, such that loading and unloading of the goods become simpler and more ordered.

The technical problem of the present disclosure is realized through the technical solution as follows:

A binding belt tensioner comprises a fastener, a wrenching part and a ratchet rotatably mounted on the inner end of the fastener and the inner end of the wrenching part, and also comprises a fixing binding belt fixedly connected to the fastener and a tensioning binding belt of which one end is wound on a ratchet shaft of the ratchet in a winding manner and the other end forms a binding free end; a clamping part which elastically pushes and inwards slides is arranged in the fastener, and a checking part which elastically pushes and inwards slides is arranged in the wrenching part; the clamping part and the checking part are both meshed on the ratchet, the wrenching part performs continuous reciprocated wrenching relative to the fastener and drives the ratchet to form one-way intermittent rotation, and further the tensioning binding belt is wound to realize a tensioning action; the clamping part and the checking part are both separated from the ratchet, the binding free end of the tensioning binding belt is pulled outwards and the ratchet is driven to freely rotate to realize a belt outputting action, and the ratchet shaft is provided with a coil spring and a coil spring locking mechanism which are coaxially mounted; the outer end of the coil spring is a fixing end, and the inner end is fixedly mounted on the ratchet shaft and is wound and compressed on the ratchet shaft due to rotation of the output belt of the ratchet so as to form elastic potential energy; the coil spring locking mechanism comprises a one-way rotating tooth piece fixedly mounted on the ratchet shaft and an elastic locking rod matched with the one-way rotating tooth piece; the clamping part and the checking part are both separated from the ratchet, the elastic locking rod is meshed on the one-way rotating tooth piece, and the one-way rotating tooth piece is controlled by rotation of the output belt of the ratchet to form one-way rotation; or the elastic locking rod is separated from the one-way rotating tooth piece, and the coil spring releases the elastic potential energy and drives the ratchet to automatically wind the tensioning binding belt.

The fastener comprises a bottom plate and two side plates which are vertically connected on the bottom plate respectively, the inner ends of the two side plates are both provided with a fastening flange, and each fastening flange is provided with a shaft hole for mounting the ratchet shaft through a penetrating manner; the clamping part is mounted between the two side plates; and the outer circumference of the fastening flange is higher than the ratchet, an arc slot lower than the ratchet is disposed on the outer circumference of the fastening flange, and the checking part is tightly attached into the arc slot in a sliding manner.

The wrenching part comprises a push plate and two leaning plates respectively vertically connected to the push plate, a wrenching flange is mounted on the inner end of each of the two leaning plates, each wrenching flange is provided with a shaft hole for mounting the ratchet shaft thorough a penetrating manner, and the outer ends of the two leaning plates are provided with handles; the checking part is disposed between the two leaning plates; and the outer circumference of the wrenching flange connected to the leaning plate is provided with a checking arc higher than the ratchet, and the clamping part is pushed by the checking arc to be separated from the ratchet.

The ratchet is mounted between the two wrenching flanges, the two wrenching flanges are mounted between the two fastening flanges, the ratchet shaft penetrates through the shaft hole of the wrenching flanges and the shaft hole of the fastening flanges in sequence to be exposed, and the fastening flanges and the wrenching flanges and the ratchet form coaxial rotating mounting.

The coil spring and the coil spring locking mechanism are respectively mounted on the two exposed ends of the ratchet shaft; the coil spring is concealed and mounted in a coil spring cover, the coil spring cover is fixedly mounted on an outer side surface of the fastening flange, the outer end of the coil spring is embedded onto the coil spring cover and forms a fixing end, and the inner end is fixedly mounted on the ratchet shaft; the coil spring locking mechanism is concealed and mounted in a locking cover, and the locking cover is fixedly mounted on the outer side surface of the fastening flange; the elastic locking rod is movably disposed in the locking cover, the upper end of the elastic locking rod is provided with a pressing cover exposed out of the outer surface of the locking cover, the lower end of the elastic locking rod is provided with a locking piece, one side of the elastic locking rod is provided with a torsional spring mounted in the locking cover, and two torsional spring feet of the torsional spring are respectively mounted on the elastic locking rod and the locking cover, and push the elastic locking rod to upwards move to drive the locking piece to be meshed with the one-way rotating tooth piece.

The outer side surface of the fastening flange is provided with a clamping groove, and the outer circumference of the coil spring cover and that of the locking cover are both provided with clamping pieces clamped in clamping groove; and the coil spring cover and the locking cover are both provided with fixing pieces extending outwards and fixedly mounted on the outer side surface of the fastening flange.

The ratchet comprises the ratchet shaft and a shaft sleeve sleeving the ratchet shaft, and the ratchet shaft and the shaft sleeve are of a transmission connection structure; a fixedly mounted ratchet piece is arranged on each of the two ends of the shaft sleeve, the shaft sleeve is provided with a belt penetrating groove, and one end of the tensioning binding belt penetrates through the belt penetrating groove to be connected on the ratchet shaft.

The end part of the ratchet shaft is provided with a mounting groove for embedding and fixing the inner end of the coil spring, and a spacer bush is disposed between the ratchet shaft and the shaft hole.

The inner end of the fastener is provided with a guide rod fixedly connected between the two side plates, and the tensioning binding belt penetrates between the guide rod and the bottom plate; and the outer end of the fastener is provided with a mounting rod fixedly connected between the two side plates, and the fixing binding belt is fixedly connected on the mounting rod.

The inner end and outer end of the fastener are both provided with sheaths, and the sheath on the inner end of the fastener is provided with a binding belt hole for the tensioning binding belt to penetrate through.

Compared with the prior art, according to the disclosure herein, mainly the ratchet shaft for winding the tensioning binding belt is provided with a coil spring and a coil spring locking mechanism which are coaxially mounted; when the ratchet shaft rotates for belt outputting, the coil spring can be driven synchronously to wind and compress the ratchet shaft to form elastic potential energy, and the elastic potential energy of the coil spring is locked by the coil spring locking mechanism; when the coil spring locking mechanism is operated to release the elastic potential energy of the coil spring, then the ratchet shaft is driven to automatically quickly rewind the tensioning binding belt for use of the binding belt tensioner next time. Therefore, by additionally disposing the coil spring and the coil spring locking mechanism on the ratchet shaft, while the fast and reliable binding of the goods by the binding belt tensioner is not affected, the binding belt tensioner has the advantages of portability in belt collecting, labor saving in operation and the like, such that the loading and unloading efficiency of the goods is improved and loading and unloading of the goods become simpler and more ordered.

DETAILED DESCRIPTION

Embodiments of the disclosure are explained in detail according to the drawings above.

As shown in FIGS. 1-21, 1 fastener, 11 bottom plate, 12 side plate, 13 fastening flange, 14 arc groove, 141 upper groove wall, 142 lower groove wall, 15 clamping groove, 16 clamping part chute, 17 mounting rod, 18 guide rod, 19 clamping part, 2 wrenching part, 21 handle, 22 checking part, 23 leaning plate, 24 wrenching flange, 25 checking part chute, 26 checking arc, 27 limiting convex, 28 push plate, 3 coil spring locking mechanism, 31 one-way rotating tooth piece, 32 elastic locking rod, 321 locking piece, 33 pressing cover, 331 separating stopping structure, 34 torsional spring, 4 sheath, 41 binding belt hole, 5 locking cover, 51 moving groove, 52 torsional spring column, 6 ratchet, 61 ratchet shaft, 611 mounting groove, 62 spacer bush, 63 snap spring, 64 ratchet piece, 641 ratchet, 65 shaft bush, 651 belt penetrating groove, 7 coil spring cover, 71 embedding groove, 8 shaft hole, 9 coil spring, 10 spring, 571 clamping piece, 572 fixing piece.

The binding belt tensioner, as shown in FIGS. 1-6, is a ratchet type small-sized auxiliary tool for fast binding and bundling goods in a laborsaving manner, and its structure mainly consists of a fastener 1, a wrenching part 2, a ratchet 6, a fixing binding belt (not shown) and a tensioning binding belt (not shown).

Figure 7:
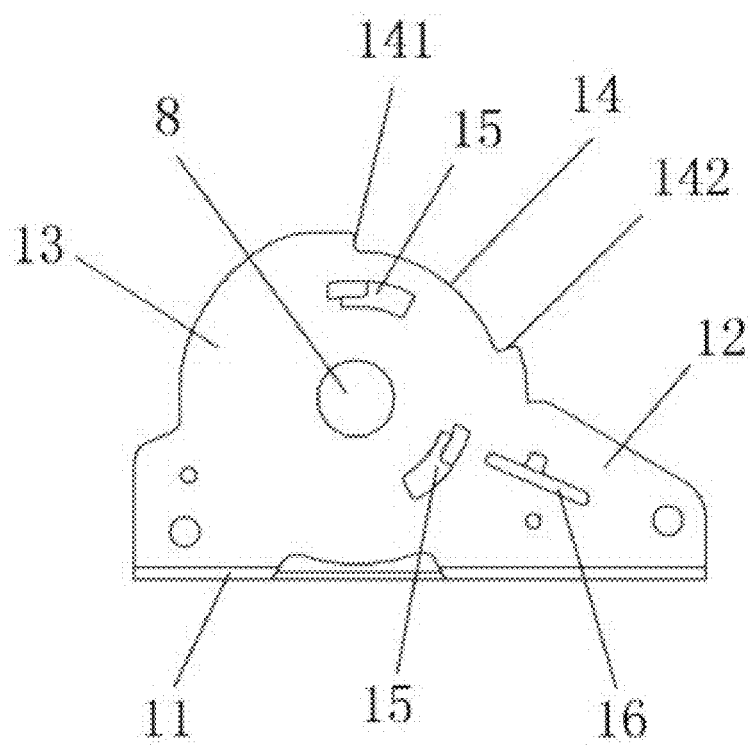
FIG. 7 is a front view of a fastener.
Figure 8:
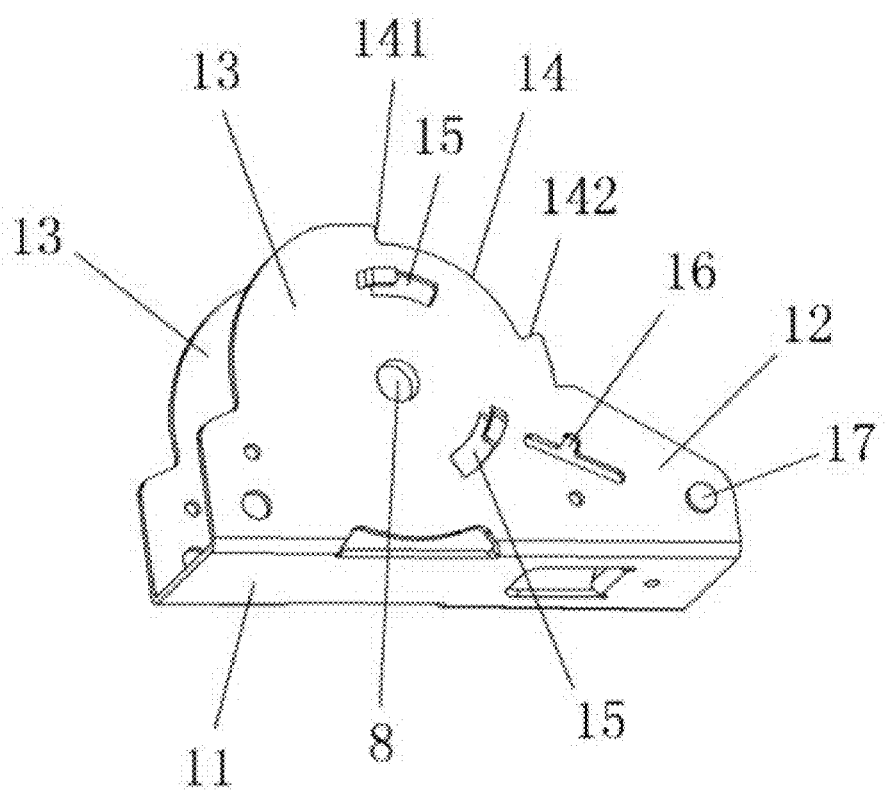
FIG. 8 is a space diagram of FIG. 7.

The fastener 1, as shown in FIGS. 7 and 8, comprises a bottom plate 11 and two side plates 12 vertically connected on the bottom plate respectively, thereby forming a structural part with a U-shaped cross section, the inner end of each of the two side plates 12 is provided with a fastening flange 13, a shaft hole 8 is formed in the center of each fastening flange, and the shaft holes 8 of the two fastening flanges 13 are just located in the same horizontal axial line; the inner end of the fastener 1 is provided with a guide rod 18 fixedly connected between the two side plates 12 and a plastic sheath 4 fixedly sleeving the inner end of the fastener 1, and the sheath is provided with a rectangular binding belt hole 41; the outer end of the fastener 1 is provided with a mounting rod 17 fixedly connected between the two side plates 12 and a plastic sheath 4 fixedly sleeving the outer end of the fastener 1; the mounting rod 17 is provided with a fixing binding belt fixedly connected, and a connecting hook is disposed on the end part of the fixing binding belt so as to facilitate hooking and binding of the binding belt; and the two sheaths 4 play a role of buffering when the fastener 1 is collided.

Figure 9:
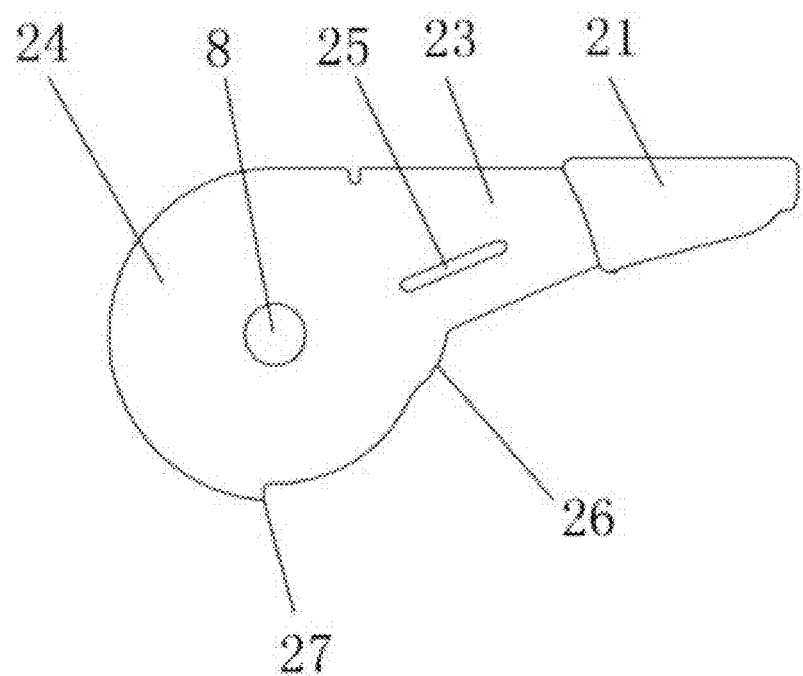
FIG. 9 is a front view of a wrenching part.
Figure 10:
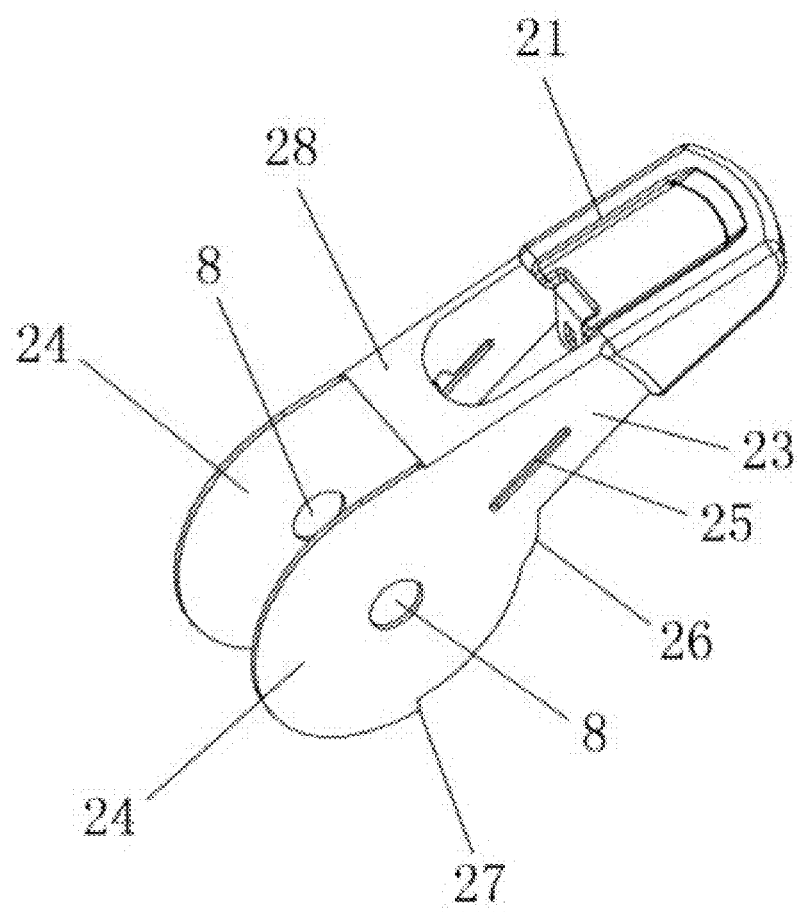
FIG. 10 is a space diagram of FIG. 9.

The wrenching part 2, as shown in FIGS. 9 and 10, comprises a push plate 28 and two leaning plates 23 vertically connected to the push plate respectively, thereby forming a structural part with an inverted U-shaped cross section, a wrenching flange 24 is disposed on the inner end of each of the leaning plates 23, a shaft hole 8 is disposed in the center of the wrenching flange, the shaft holes 8 of the wrenching flanges 24 are just located in the same horizontal axial line, and plastic handle 21 is mounted on the outer ends of the two leaning plates 23, so as to facilitate the wrenching operation of the wrenching part 2.

Figure 11:
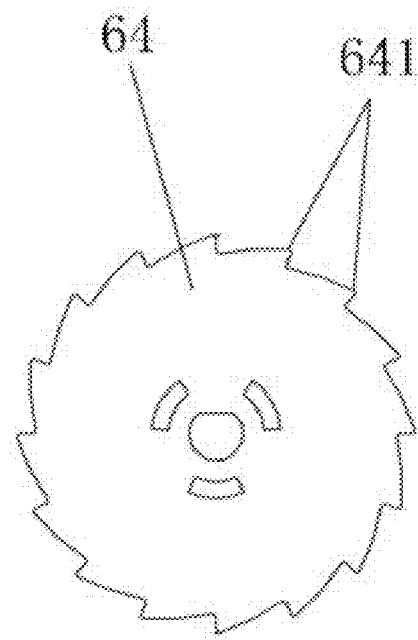
FIG. 11 is a front view of a ratchet.
Figure 12:
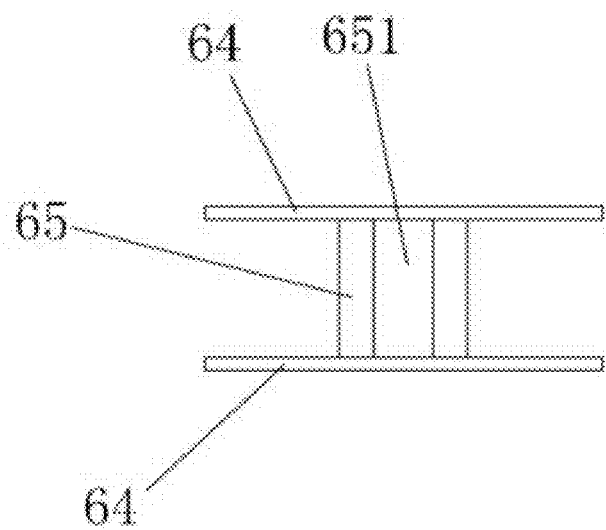
FIG. 12 is a top view of FIG. 11.
Figure 13:
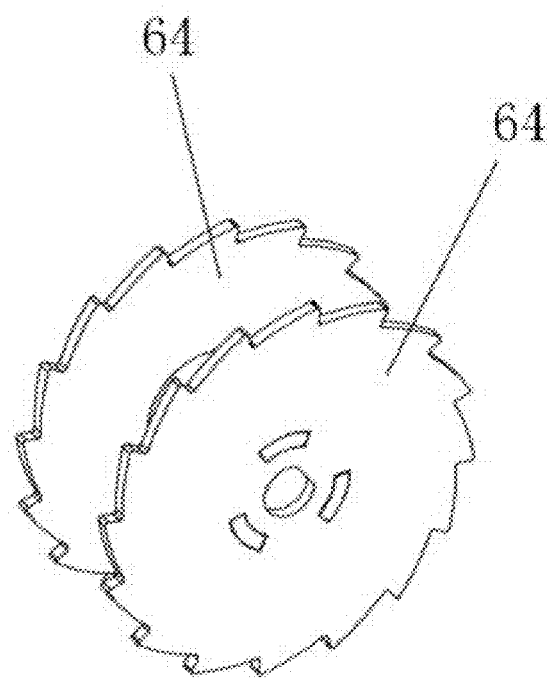
FIG. 13 is a space diagram of FIG. 11.

The ratchet 6, as shown in FIGS. 11-13, comprises a ratchet shaft 61 and a shaft sleeve 65 sleeving the ratchet shaft, the ratchet shaft 61 and the shaft sleeve 65 are of a transmission connecting structure sleeved by a single flat washer structure, that is, the ratchet shaft 61 and the shaft sleeve 65 can form a synchronous rotating structural relation; fixedly mounted ratchet pieces 64 same in shape are disposed on both ends of the shaft sleeve 65 respectively, and the shaft sleeve 65 is provided with a belt penetrating groove 651 disposed along the axial direction.

The ratchet 6 is mounted between the two wrenching flanges 24, the two wrenching flanges are then mounted between the two fastening flanges 13, then two ends of the ratchet shaft 61 are respectively supported in the shaft holes 8 of the fastener 1 and the wrenching part 2 to form a rotating structure of the ratchet 6, specifically, the end part of the ratchet shaft 61 penetrates through the shaft holes 8 of the wrenching flanges 24 and the fastening flanges 13 in sequence to be exposed, and the fastening flanges 13, the wrenching flanges 24 and the ratchet 6 form coaxial rotating mounting; while a plastic spacer bush 62 is further required to be disposed between the ratchet shaft 61 and the shaft hole 8 and is fastened and located through a snap spring 63, such that stable and reliable rotation of the ratchet shaft 61 in the shaft hole 8 is ensured.

One end of the tensioning binding belt penetrates through the belt penetrating groove 651 on the shaft sleeve 65 to be connected on the ratchet shaft 61, and accordingly is wound and connected on the shaft sleeve 65 of the ratchet 6 along with rotation of the ratchet 6, that is, indirectly wound and connected on the ratchet shaft 61 layer by layer, the other end of the tensioning binding belt penetrates between the guide rod 18 and the bottom plate 11 and the binding belt hole 41 in the sheath 4 at the inner end of the fastener 1 in sequence to form a binding free end. Therefore, through the structural design of the guide rod 18 and the binding belt hole 41, the binding free end can be guided to be stably pulled outwards, and unfavorable phenomena of knotting and twisting of the tensioning binding belt are avoided.

A clamping part 19 is disposed between two side plates 12 of the fastener 1, both ends of the clamping part are respectively assembled in clamping part chutes 16 of the two side plates 12 in a sliding manner, the rear end of the clamping part 19 has a spring 10 for pushing, therefore, under a normal state, due to a thrust of the spring, the clamping part 19 has a trend of elastically pushing and sliding inwards, and further is meshed and clamped in ratchet teeth 641 of the ratchet 6; a checking part 22 is further provided between the two leaning plates 23 of the wrenching part 2, both ends of the checking part are respectively assembled in checking part chutes 25 of the two leaning plates 23 in a sliding manner, the rear end of the checking part 22 is also provided with an elastic spring 10 for pushing, therefore, under the normal state, due to the thrust of the spring, the checking part 22 has a trend of elastically pushing and sliding inwards, and is further meshed and clamped in the ratchet teeth 641 of the ratchet 6.

Figure 1:
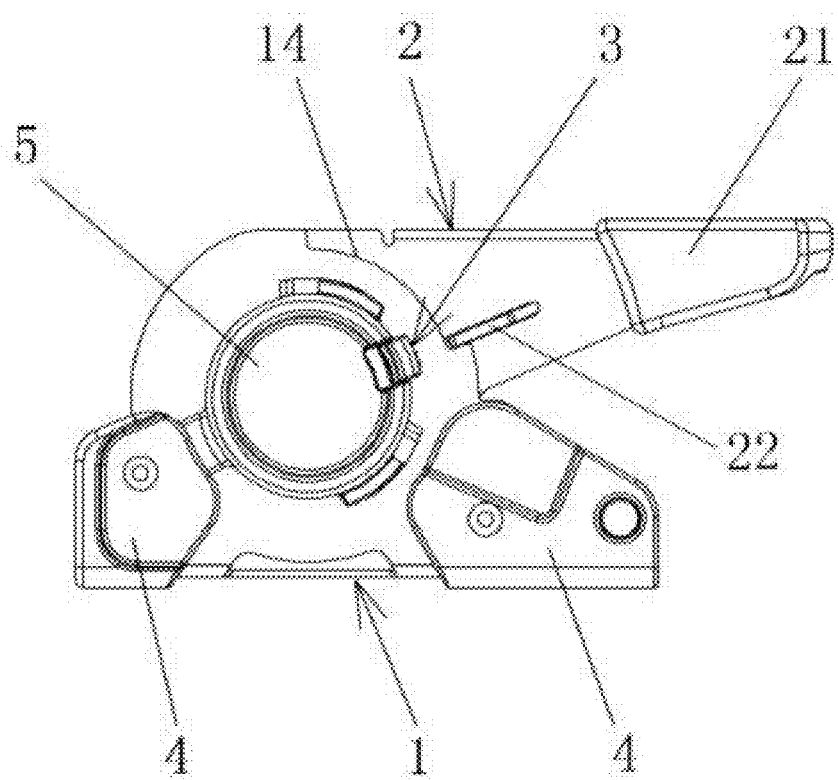
FIG. 1 is a front view of the binding belt tensioner.
Figure 2:
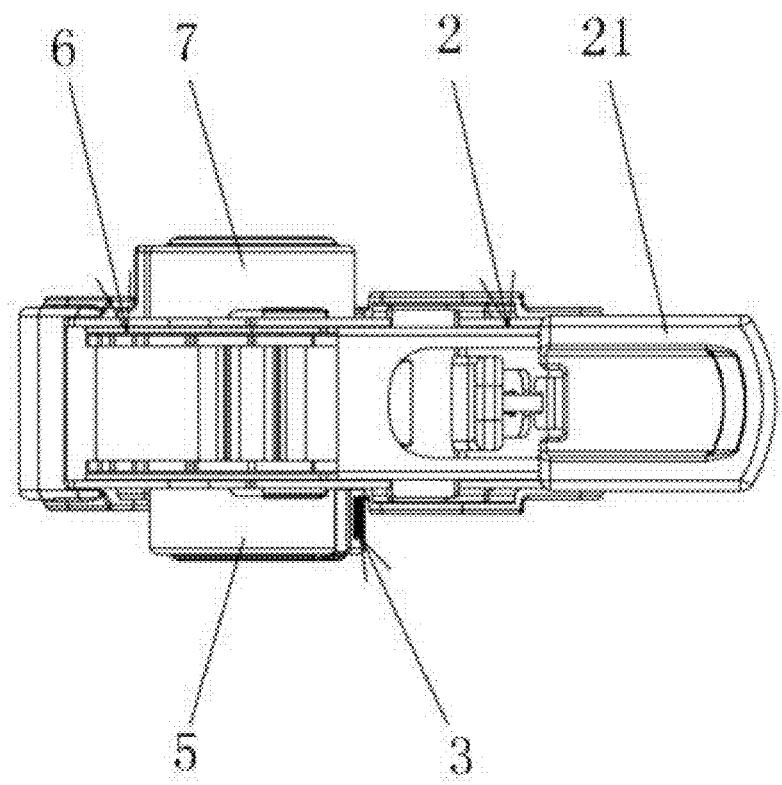
FIG. 2 is a top view of FIG. 1.
Figure 3:
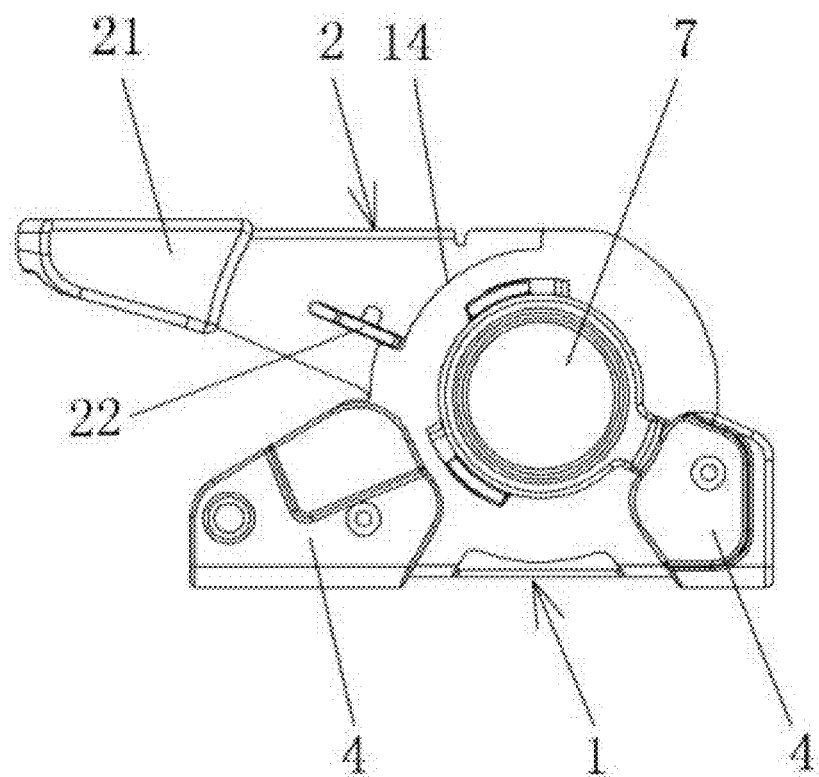
FIG. 3 is a rear view of FIG. 1.
Figure 4:
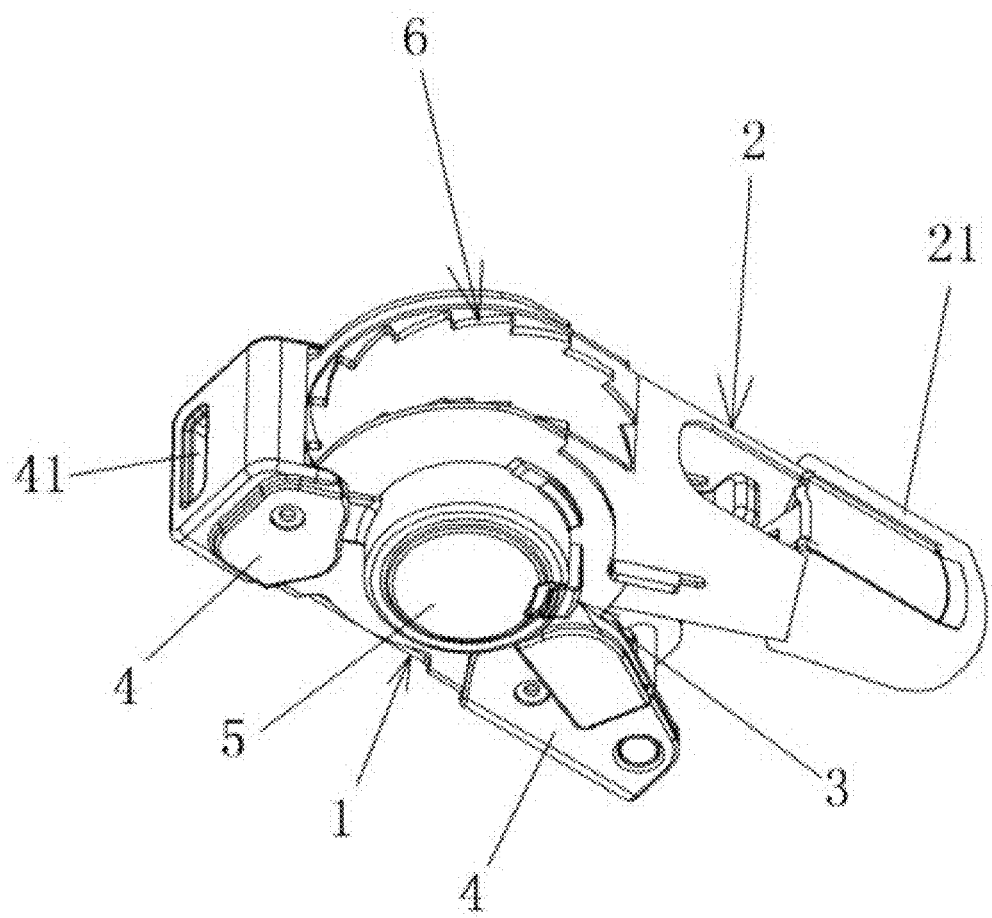
FIG. 4 is a space diagram of FIG. 1 in one visual direction.

Therefore, the fastener 1, the clamping part 19, the wrenching part 2, the checking part 22 and the ratchet 6 just constitute a set of typical ratchet operation mechanism. When the checking part 19 and the checking part 22 are both meshed on the ratchet 6, the wrenching part 2 is operated to perform continuous reciprocated wrenching relative to the fastener 1, that is, an action similar to reciprocated opening and closing, then the ratchet 6 is driven to form one-way intermittent rotation, an example is as shown in FIG. 4, the ratchet teeth 641 of the ratchet 6 are both leaned backwards, then the one-way intermittent rotation of the ratchet 6 is counterclockwise intermittent rotation, therefore, the tensioning binding belt can be wound on the ratchet shaft 61 layer by layer, that is, a tensioning action of the binding belt tensioner is realized, and binding work of goods is realized; when the clamping part 19 and the checking part 22 are both separated from the ratchet 6, the ratchet 6 is in a free rotation state without restriction, then the binding free end of the tensioning binding belt is pulled outwards to drive the ratchet 6 to freely rotate clockwise to realize a belt outputting action, that is, during goods binding, the tensioning binding belt can be pulled for a proper use length according to a binding volume of the goods.

In addition, in order that the two actions above are reliably finished, the outer circumference of the fastening flange 13 needs to be higher than the ratchet teeth 641 of the ratchet 6, as shown in FIG. 7, the outer circumference located on the top of the fastening flange 13 is provided with an arc groove 14 lower than the ratchet teeth 641, then the checking part 22 is elastically pushed by the spring 10 to slide and cling into the arc slot 14, and meanwhile is also meshed in the ratchet teeth 641. Therefore, when participating in the one-way intermittent rotation of the ratchet 6, the checking part 22 slides along the arc slot 14, and then the length of the arc slot 14 is equivalent to a sliding stroke distance of the checking part 22.

The outer circumference of the wrenching flange 24 connected to the leaning plate 23 is provided with a checking arc 26 higher than the ratchet 6, specifically the ratchet teeth 641 as shown in FIG. 9, the clamping part 19 is touched and pushed by the checking arc to be separated from the ratchet 6 along with the wrenching part 2 in a wrenching process, an action finishing manner of such state is: the wrenching part 2 is wrenched toward a collecting state relative to the fastener 1, at this point, the checking part 22 will slide on the ratchet teeth 641 and slides along the arc groove 14 to be stopped on a lower groove wall 142 of the arc groove, then checking part 22 is driven by an external force to move backwards and cross over the lower groove wall 142 of the arc groove 14 to make a contact with the outer circumference of the fastening flange 13, the checking part 22 under such state has totally been separated from the ratchet teeth 641, the wrenching part 2 can be continuously wrenched to the collecting state relative to the fastener 1, while the checking arc 26 pushes the clamping part 19 to move backwards, finally, the clamping part is caused to also be separated from the ratchet teeth 641, therefore, the belt outputting rotation of ratchet 6 is also facilitated after the checking part 22 and the clamping part 19 are both separated from the ratchet teeth 641.

A limiting convex 27 is further disposed on the outer circumference of the lower part of the wrenching flange 24, and plays a role same as that of the upper groove wall 141 of the arc groove 14, both for limiting an opening angle of the wrenching part 2 relative to the fastener 1, that is, for limiting a tensioning action range of the binding belt tensioner, then the checking part 22 is stopped on the upper groove wall 141 of the arc groove along with sliding of the arc groove 14 to limit further wrenching of the wrenching part 2; correspondingly, the limiting convex 27 is also rotated along with wrenching of the wrenching part 2 and when the checking part 2 is limited, the limiting convex 27 just makes a contact with the clamping part 19 to be limited, therefore, double limiting functions can be realized by mutual match of the two limiting structures.

The binding belt tensioner can also give an automatic belt collecting function after realizing the belt outputting action, and the structure is mainly embodied in that both exposed ends of the ratchet shaft 61 are respectively additionally provided with a coil spring 9 and a spring locking mechanism 3 which are coaxially mounted.

Figure 5:
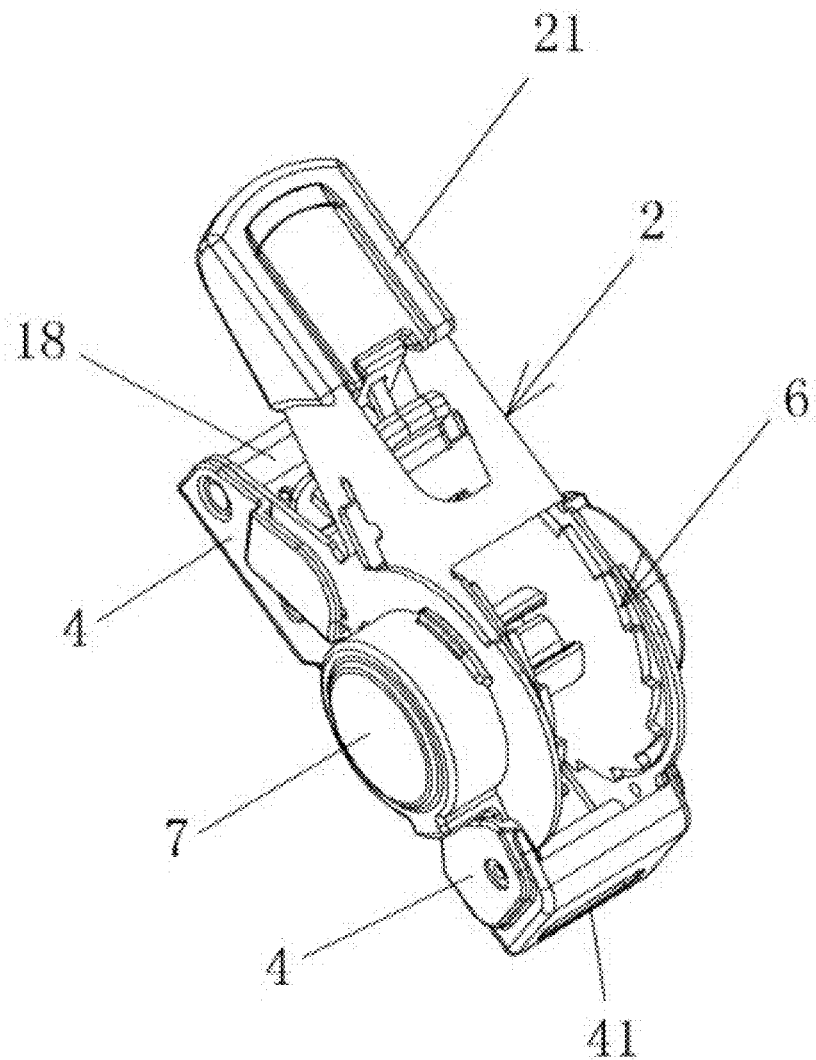
FIG. 5 is a space diagram of FIG. 1 in another visual direction.
Figure 6:
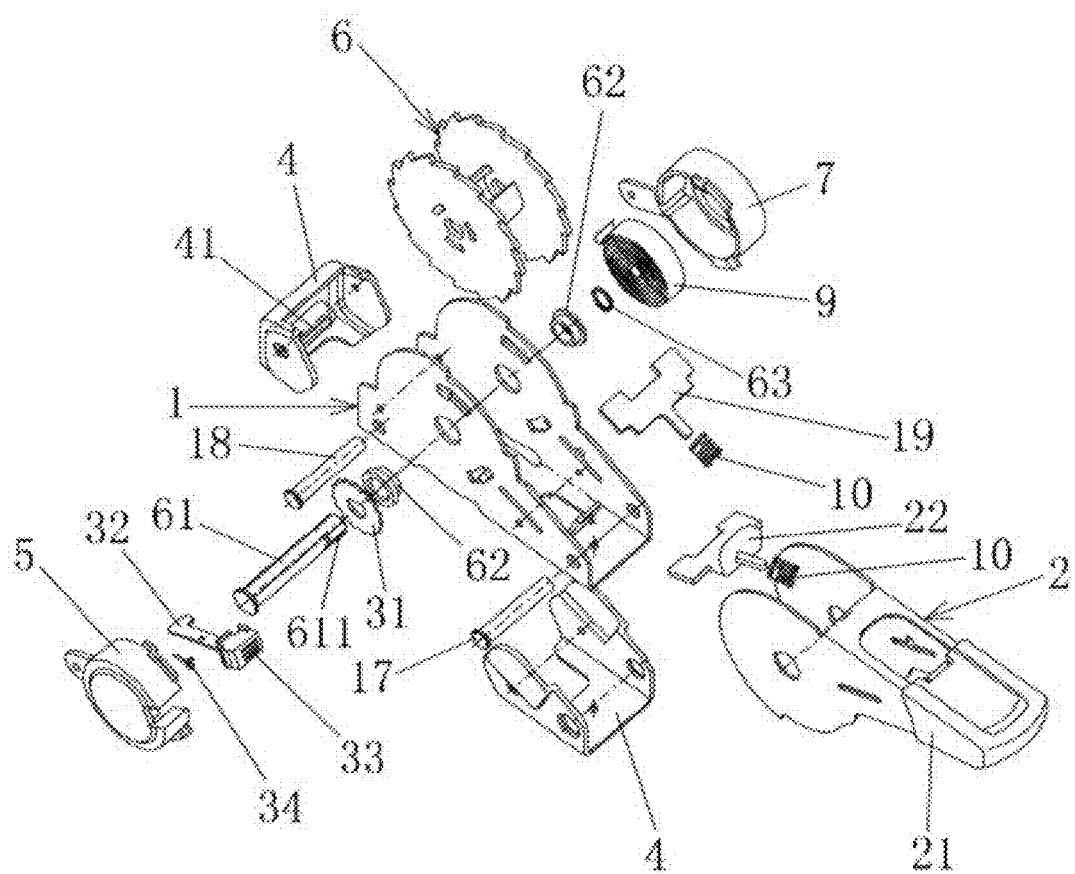
FIG. 6 is a three-dimensional exploded view of the binding belt tensioner.
Figure 14:
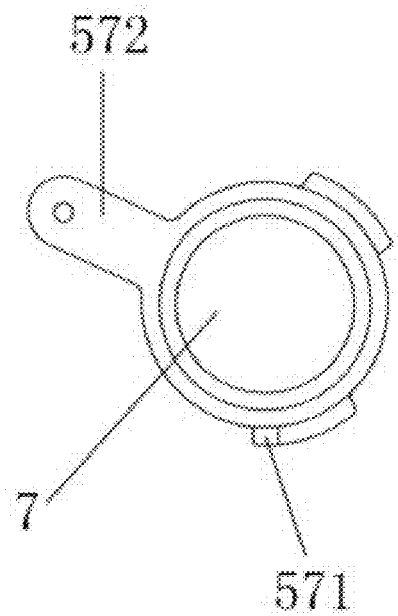
FIG. 14 is a front view of a coil spring cover.
Figure 15:
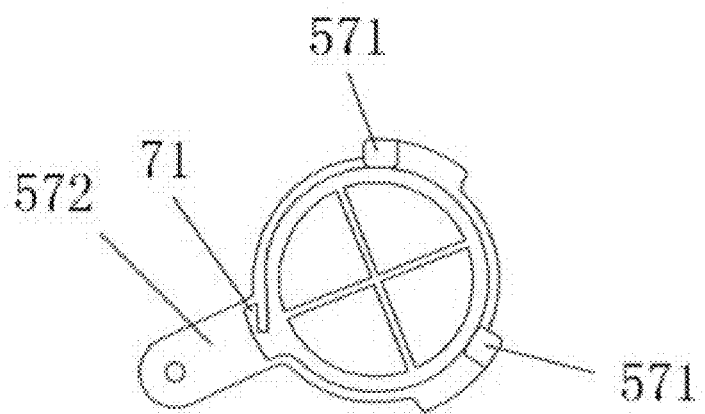
FIG. 15 is a rear view of FIG. 14.
Figure 16:
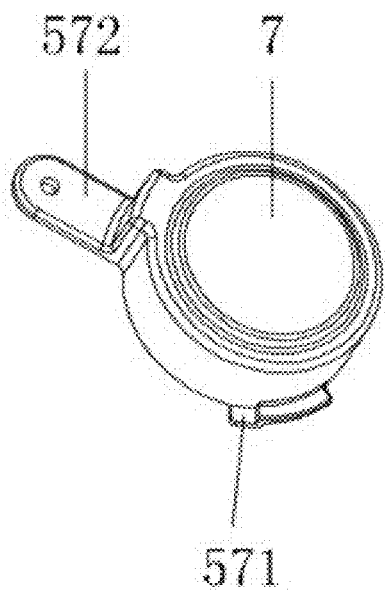
FIG. 16 is a space diagram of FIG. 14.

The coil spring 9 is concealed and mounted in a round coil spring cover 7, as shown in FIG. 5, the coil spring cover 7 is fixedly mounted on the outer side surface of the fastening flange 13, a specific structure is that the outer side surface of the fastening flange 13 is provided with a pair of clamping grooves 15 as shown in FIGS. 7 and 8, correspondingly, a pair of clamping pieces 571 and a fixing piece 572 extending outwards as shown in FIGS. 14-16 are arranged on the outer circumference of the coil spring cover 7, the pair of clamping pieces 571 are just clamped in the pair of clamping grooves 15, and then the fixing piece 572 is connected on the outer side surface of the fastening flange 13 by a screw, such that a fixing mounting structure between the coil spring cover 7 and the fastening flange 13 is realized.

The outer end of the coil spring 9 is embedded in a preset embedding groove 71 on the coil spring cover 7 to form a fixing end, the inner end of the coil spring 9 is embedded and fixed on a preset mounting groove 611 on the end part of the ratchet shaft 61, and when the ratchet 6 is located in a belt outputting state, the coil spring 9 can be wound and compressed on the ratchet shaft 61 to form elastic potential energy.

Figure 17:
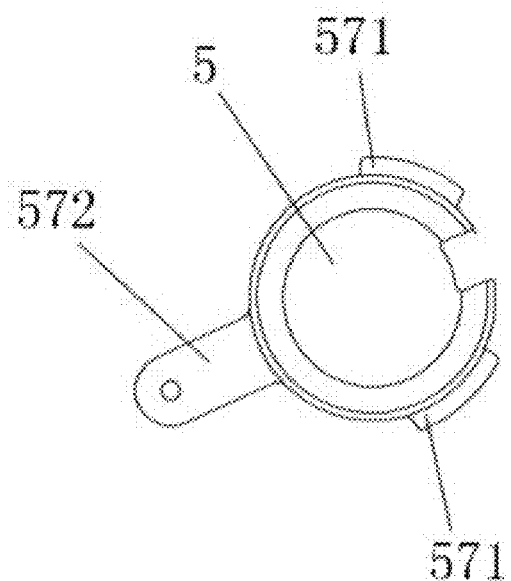
FIG. 17 is a front view of a locking cover.
Figure 18:
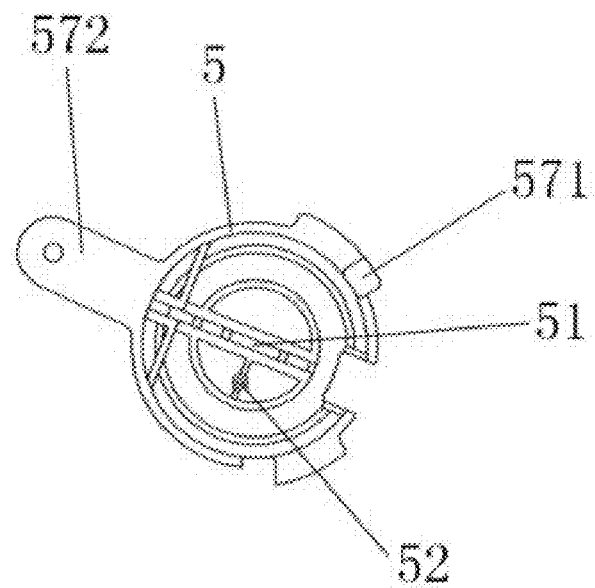
FIG. 18 is a rear view of FIG. 17.
Figure 19:
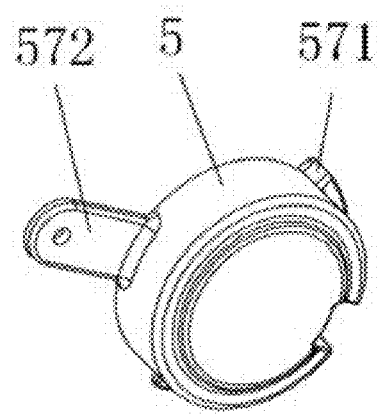
FIG. 19 is a space diagram of FIG. 17.

The coil spring locking mechanism 3 is concealed and mounted in a locking cover 5, an example is as shown in FIG. 4, the locking cover 5 is fixedly mounted on the outer side surface of the fastening flange 13, a specific structure of the locking cover 5 is totally consistent with mounting of the coil spring cover 7, that is, the outer circumference of the locking cover 5 is also provided with a pair of clamping pieces 571 and a fixing piece 572 as shown in FIGS. 17-19.

Figure 20:
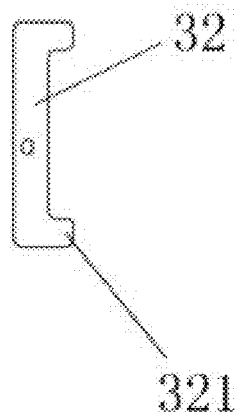
FIG. 20 is a structural schematic diagram of an elastic locking rod.
Figure 21:
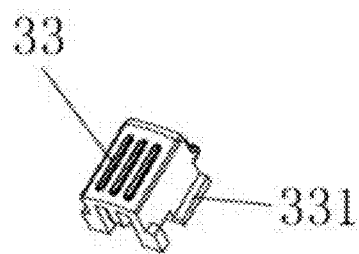
FIG. 21 is a structural schematic diagram of a pressing cover

The coil spring locking mechanism 3 comprises a one-way rotating tooth piece 31 fixedly mounted on the ratchet shaft 61 and an elastic locking rod 32 matched with the one-way rotating tooth piece 31, the elastic locking rod can form movement up and down in a moving groove 51 of the locking cover 5, the upper end of the elastic locking rod 32 is provided with a pressing cover 33 exposed out of the outer surface of the locking cover 5 as shown in FIG. 21, the pressing cover is provided with a separating stopping mechanism 331 which can prevent separation from the locking cover 5, the lower end of the elastic locking rod 32 is provided with a locking piece 321 as shown in FIG. 20, one side of the elastic locking rod 32 is provided with a torsional spring 34 mounted on a torsional spring column 52 in the locking cover 5, two torsional spring feet of the torsional spring are mounted on the elastic locking rod 32 and the locking cover 5 respectively, therefore under a normal state, the elastic locking rod 32 is pushed by a torsional force of the torsional spring 34 to move upwards, and further the locking piece 321 is meshed with the one-way rotating tooth piece 31 always.

When the clamping part 19 and the checking part 22 are both separated from the ratchet 6, and the ratchet rotates for belt outputting, the elastic locking rod 32 can control the one-way rotating tooth piece 31 to form one-way rotation, that is, the belt outputting rotation of ratchet 6 is not stopped, the one-way rotating tooth piece 31 is driven to synchronously rotate, and at this point, the coil spring 9 wound and compressed on the ratchet shaft 61 forms elastic potential energy; in such working state, since the locking piece 321 of the elastic locking rod 32 is always meshed with the one-way rotating locking piece 31, that is to say, the coil spring locking mechanism 3 is in a locking state always, therefore, even though the coil spring 9 forms great elastic potential energy, the ratchet 6 cannot be driven to rotate back.

When the exposed pressing cover 33 is pressed to drive the locking piece of the elastic locking rod 32 to be separated from the one-way rotating tooth piece 31, that is, the coil spring locking mechanism 3 is in an unlocking state, and then the elastic potential energy of the coil spring 9 is released to drive the ratchet 6 to rotate back quickly, such that the tensioning binding belt is automatically wound for use next time.

The abovementioned is merely specific embodiments of the present disclosure, those skilled in the art should understand that any structural design equivalent to the embodiments should fall within a protective scope of the present disclosure.

What is claimed is:
1. A binding belt tensioner, comprising a fastener, a wrenching part and a ratchet rotatably mounted on the inner end of the fastener and the inner end of the wrenching part, wherein the binding belt tensioner also comprises a fixing binding belt fixedly connected to the fastener and a tensioning binding belt of which one end is wound and connected on a ratchet shaft of the ratchet and the other end forms a binding free end; a clamping part which elastically pushes and inwards slides is arranged in the fastener, and a checking part which elastically pushes and inwards slides is arranged in the wrenching part; the clamping part and the checking part are both meshed on the ratchet, the wrenching part performs continuous reciprocated wrenching relative to the fastener, and drives the ratchet to form one-way intermittent rotation, and further the tensioning binding belt is wound to realize a tensioning action; the clamping part and the checking part are both separated from the ratchet, the binding free end of the tensioning binding belt is pulled outwards and the ratchet is driven to freely rotate to realize a belt outputting action, wherein:

a. the ratchet shaft is provided with a coil spring and a coil spring locking mechanism which are coaxially mounted; the outer end of the coil spring is a fixing end, and the inner end is fixedly mounted on the ratchet shaft and is wound and compressed on the ratchet shaft due to rotation of the output belt of the ratchet so as to form elastic potential energy;

b. the coil spring locking mechanism comprises a one-way rotating tooth piece fixedly mounted on the ratchet and an elastic locking rod matched with the one-way rotating tooth piece; the clamping part and the checking part are both separated from the ratchet, the elastic locking rod is meshed on the one-way rotating tooth piece, and the one-way rotating tooth piece is controlled by rotation of the output belt of the ratchet to form one-way rotation; or the elastic locking rod is separated from the one-way rotating tooth piece, and the coil spring releases the elastic potential energy and drives the ratchet to automatically wind the tensioning binding belt.

2. The binding belt tensioner according to claim 1, wherein the fastener comprises a bottom plate and two side plates which are vertically connected on the bottom plate respectively, the inner ends of the two side plates are both provided with fastening flanges, and each fastening flange is provided with a shaft hole for mounting the ratchet shaft through a penetrating manner; the clamping part is mounted between the two side plates; and the outer circumference of the fastening flange is higher than the ratchet, an arc slot lower than the ratchet is disposed on the outer circumference of the fastening flange, and the checking part is tightly attached into the arc slot in a sliding manner.

3. The binding belt tensioner according to claim 1, wherein the wrenching part comprises a push plate and two leaning plates respectively vertically connected to the push plate, a wrenching flange is mounted on the inner end of each of the two leaning plates, each wrenching flange is provided with a shaft hole for mounting the ratchet shaft through a penetrating manner, and the outer ends of the two leaning plates are provided with handles; the checking part is disposed between the two leaning plates; and the outer circumference of the wrenching flange connected to the leaning plate is provided with a checking arc higher than the ratchet, and the clamping part is pushed by the checking arc to be separated from the ratchet.

4. The binding belt tensioner according to claims 1, wherein the ratchet is mounted between the two wrenching flanges, the two wrenching flanges are mounted between the two fastening flanges, the ratchet shaft penetrates through the shaft hole of the wrenching flanges and the shaft hole of the fastening flanges in sequence to be exposed, and the fastening flanges and the wrenching flanges and the ratchet form coaxial rotating mounting.

5. The binding belt tensioner according to claim 4, wherein the coil spring and the coil spring locking mechanism are respectively mounted on the two exposed ends of the ratchet shaft; the coil spring is concealed and mounted in a coil spring cover, the coil spring cover is fixedly mounted on an outer side surface of the fastening flange, the outer end of the coil spring is embedded onto the coil spring cover and forms a fixing end, and the inner end is fixedly mounted on the ratchet shaft; the coil spring locking mechanism is concealed and mounted in a locking cover, and the locking cover is fixedly mounted on the outer side surface of the fastening flange; the elastic locking rod is movably disposed in the locking cover, the upper end of the elastic locking rod is provided with a pressing cover exposed out of the outer surface of the locking cover, the lower end of the elastic locking rod is provided with a locking piece, one side of the elastic locking rod is provided with a torsional spring mounted in the locking cover, and two torsional spring feet of the torsional spring are respectively mounted on the elastic locking rod and the locking cover, and push the elastic locking rod to upwards move to drive the locking piece to be meshed with the one-way rotating tooth piece.

6. The binding belt tensioner according to claim 5, wherein the outer side surface of the fastening flange is provided with a clamping groove, and the outer circumference of the coil spring cover and that of the locking cover are both provided with a clamping piece clamped in clamping groove; and the coil spring cover and the locking cover are both provided with a fixing piece extending outwards and fixedly mounted on the outer side surface of the fastening flange.

7. The binding belt tensioner according to claim 4, wherein the ratchet comprises the ratchet shaft and a shaft sleeve sleeving the ratchet shaft, and the ratchet shaft and the shaft sleeve are of a transmission connecting structure; a fixedly mounted ratchet piece is arranged on each of the two ends of the shaft sleeve, the shaft sleeve is provided with a belt penetrating groove, and one end of the tensioning binding belt penetrates through the belt penetrating groove to be connected on the ratchet shaft.

8. The binding belt tensioner according to claim 7, wherein the end part of the ratchet shaft is provided with a mounting groove for embedding and fixing the inner end of the coil spring, and a spacer bush is disposed between the ratchet shaft and the shaft hole.

9. The binding belt tensioner according to claim 2, wherein the inner end of the fastener is provided with a guide rod fixedly connected between the two side plates, and the tensioning binding belt penetrates between the guide rod and the bottom plate; and the outer end of the fastener is provided with a mounting rod fixedly connected between the two side plates, and the fixing binding belt is fixedly connected on the mounting rod.

10. The binding belt tensioner according to claim 1, wherein the inner end and outer end of the fastener are both provided with sheaths, and the sheath on the inner end of the fastener is provided with a binding belt hole for the tensioning binding belt to penetrate through.

* * * * *